US012754894B2

(12) United States Patent
Saha et al.

(10) Patent No.: US 12,754,894 B2
(45) Date of Patent: Oct. 6, 2026

(54) EFFICIENTLY PROCESSING VECTOR QUERIES, WITH QUERY VECTORS AND FILTERS, AGAINST VECTOR INDEXES

(71) Applicant: Oracle International Corporation, Redwood Shores, CA (US)

(72) Inventors: Agnivo Saha, Belmont, CA (US); Rohan Aggarwal, Menlo Park, CA (US); Ruoyu He, Mountain View, CA (US); Rafi Ahmed, Fremont, CA (US); Aurosish Mishra, Foster City, CA (US); Shasank Kisan Chavan, Menlo Park, CA (US); Tirthankar Lahiri, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/076,850

(22) Filed: Mar. 11, 2025

(65) Prior Publication Data

US 2025/0284681 A1 Sep. 11, 2025

Related U.S. Application Data

(60) Provisional application No. 63/563,926, filed on Mar. 11, 2024.

(51) Int. Cl.
*G06F 16/22* (2019.01)
*G06F 16/245* (2019.01)
(Continued)

(52) U.S. Cl.
CPC ........ *G06F 16/2237* (2019.01); *G06F 16/221* (2019.01); *G06F 16/2264* (2019.01);
(Continued)

(58) Field of Classification Search
CPC ............... G06F 16/2237; G06F 16/221; G06F 16/2264; G06F 16/245; G06F 16/24553;
(Continued)

(56) References Cited

U.S. PATENT DOCUMENTS

2020/0311077 A1* 10/2020 Zhang ..................... G06F 3/068
2021/0149963 A1* 5/2021 Agarwal ........... G06F 16/90332
(Continued)

*Primary Examiner* — Dangelino N Gortayo
(74) *Attorney, Agent, or Firm* — Hickman Becker Bingham Ledesma LLP

(57) ABSTRACT

Techniques for efficiently processing vector queries against vector indexes are provided. In one technique, a vector query that includes a query vector and a predicate on a non-vector column of a base table that stores a plurality of vectors is received. In response and while traversing a vector index that is based on the plurality of vectors, a set of candidate vectors is identified based on the query vector. For each candidate vector in the set of candidate vectors, a value associated with that candidate vector and the non-vector column is identified in the vector index, and it is determined whether the value satisfies the predicate. A strict subset, of the set of candidate vectors, is selected whose values for the non-vector column satisfy the predicate. For each candidate vector in the strict subset, a vector distance between the query vector and the candidate vector is computed.

20 Claims, 7 Drawing Sheets

(51) Int. Cl.
*G06F 16/2455* (2019.01)
*G06F 16/334* (2025.01)

(52) U.S. Cl.
CPC ...... *G06F 16/245* (2019.01); *G06F 16/24553* (2019.01); *G06F 16/2456* (2019.01); *G06F 16/3347* (2019.01)

(58) Field of Classification Search
CPC ............. G06F 16/2456; G06F 16/3347; G06F 16/24532
See application file for complete search history.

(56) References Cited

U.S. PATENT DOCUMENTS

| | | | | |
|---|---|---|---|---|
| 2022/0121633 | A1* | 4/2022 | Quader | G06F 16/213 |
| 2022/0129448 | A1* | 4/2022 | He | G06F 16/24564 |
| 2022/0327128 | A1* | 10/2022 | Xu | G06F 16/24542 |
| 2023/0111978 | A1* | 4/2023 | Veit | G06F 16/334 706/25 |

* cited by examiner

EFFICIENTLY PROCESSING VECTOR QUERIES, WITH QUERY VECTORS AND FILTERS, AGAINST VECTOR INDEXES

BENEFIT CLAIM

This application claims the benefit under 35 U.S.C. § 119(e) of provisional application 63/563,926, filed Mar. 11, 2024, by Lahiri et al., the entire contents of which is hereby incorporated by reference.

TECHNICAL FIELD

The present disclosure relates generally to vector indexes and, more particularly, to processing vector queries against vector indexes where the vector queries include both query vectors and filters.

BACKGROUND

A vector is a fixed length sequence of numbers, typically floating point numbers, such as [21.4, 45.2, 675.34, 19.4, 83.24], which is a five-dimensional vector. An embedding is a means of representing objects (e.g., text, images, and audio) as points in a continuous vector space where the locations of those points in space are semantically meaningful to one or more machine learning (ML) algorithms. An embedding is often represented as a vector. Generically, a vector embedding represents a point in N-dimensional space. Vector embeddings are intended to capture the important "features" of the data that the vector embeddings represent (or embed). The data a vector embedding represents can be one of many types of data, such as a document, an email, an image, or a video. Examples of features are color, size, category, location, texture, meaning, and concept. Each feature is represented by one or more numbers (dimensions) in the vector embedding. Hereinafter, a "vector embedding" is referred to as a "vector."

Today, vectors are often generated by machine-learned models (e.g., neural networks) and the features they represent are often difficult for humans to understand. One way that vectors are produced by neural networks is by capturing the outputs of the neurons in the penultimate layer, i.e., the neural network's outputs just before the final processing layer.

Distance Between Vectors

An important attribute of vectors is that the distance between two vectors is a good proxy for the similarity of the objects represented by the vectors. Two vectors that represent similar data should be a short distance from each other in vector space. The opposite is also true: dissimilar data are represented by vectors that are far apart from each other in the vector space. For example, the distance between a vector for the word "cat" and a vector for the word "dog" should be less than the distance the vector for the word "cat" and a vector for the word "plant."

The distance between two vectors is often calculated by summing the squares of the difference between the numbers in each position of the vectors:

$$(\text{Vector1}[1]-\text{Vector2}[1])\text{^}2+(\text{Vector1}[2]-\text{Vector2}[2])\text{^}2+\ldots$$

The property that vector distance represents object similarity is what allows similar data to be found using a vector database. For example, when a vector representing a picture of a dog is searched for in a vector database, the nearest vectors will be those representing other dogs, not vectors representing plants.

Vector Processing Workloads

Vector processing workloads (not to be confused with SIMD vector processing) have been used in Natural Language Processing (NLP), image recognition, recommendations, etc. Vector processing workloads have two sub-categories that require separate optimization strategies: indexing and searching. Regarding indexing, vector embeddings (or simply vectors) are indexed using approximate indexing techniques. Unlike B-tree indexes, a vector index returns many matching values ranked by similarity. Index creation and rebuild tend to be CPU intensive and are optimized for throughput.

Regarding searching, the stored vectors are searched using a class of algorithms known as "Similarity Search" or "Approximate Nearest Neighbor (ANN)" to find the closest vectors to a query vector. Search is designed to minimize CPU usage in order to minimize response time.

Vector Processing Patterns

A vector similarity search is like interactive online transaction processing (OLTP) in that end-users submit vector queries and expect an instant reply. Vector similarity search requires millisecond response time to finding vectors that are close (represent similar data) even when the database in which the vectors are stored holds billions of vectors. An example query is "find products that are similar to this picture" [reference to a digital image]." Another example query is "find corporate documents that conceptually match this natural language prompt: [NL prompt]."

Providing fast response times requires using specialized vector indexes and fast algorithms for computing distances between vectors. In some use cases, there is a need to combine vector similarity search with relational data. For example, a query may ask for data about houses that match a natural language prompt, are valued at over $1M, are in zip code 94070, and whose owner recently declared bankruptcy.

Vector Databases

Early vector workloads often used flat files or object stores to store vectors. An application would read the vectors out of their backend repositories into memory and perform vector processing using third-party libraries, such as FAISS. Generative artificial intelligence (AI) has greatly increased the volume and processing needs for vectors. Generative AI requires support for much higher volume ingest and faster filtering and retrieval. A database with vector capabilities and built-in indexing is important for these applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for efficiently processing vector queries against vector indexes are provided. In one technique, a vector query that includes a query vector and a predicate is received. Receipt of the vector query initiates a search, given the query vector, of a vector index that is built upon a base table of vectors. The base table includes one or more columns that store non-vector data. While the query vector is used to search the vector index, the predicate is applied to indexed values other than vectors in the vector index. In this way, the base table is not consulted and, therefore, the base table does not have to be joined with results of the search of the vector index.

Embodiments improve computer-related technology related to vector query processing in a database system. Embodiments remove an expensive join operation and significantly reduce the number of vector distance calculations that would normally be required in order to process a vector query.

Vector Database System Overview

Figure 1:
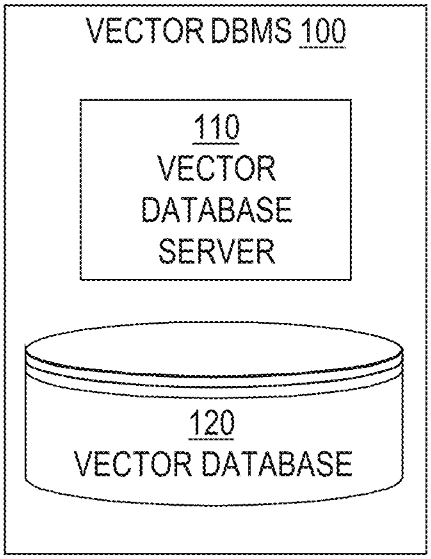
FIG. 1 is a block diagram that depicts an example vector database management system (VDBMS), in an embodiment.

FIG. 1 is a block diagram that depicts an example vector database management system (VDBMS) 100, in an embodiment. VDBMS 100 comprises a vector database server 110 and a vector database 120. Vector database server 110 is communicatively coupled to vector database 120. VDBMS 100 may be deployed in a network of an enterprise or may be deployed in a cloud environment and, therefore, may be accessible to an enterprise over one or more computer networks (e.g., the Internet). VDBMS 100 may be provisioned for an enterprise by a cloud management team of a cloud provider as needed on an enterprise-by-enterprise basis.

Vector database server 110 comprises one or more computing machines, each executing one or more compute instances that receive and process data requests, including data retrieval requests (e.g., queries) and data modification requests (i.e., for vector data modifications), such as inserting vectors, deleting vectors, and updating vectors. A computing instance translates a data request into a storage layer request that the computing instance transmits to vector database 120. A computing machine that hosts at least one compute instance includes (1) one or more processors, (2) volatile memory for storing data requests (and their respective contents) and vector data that is retrieved from vector database 120, and (3) optionally, non-volatile memory.

Vector database 120 may comprise multiple storage devices, each storing vector data and, optionally, one or more non-vector data. For example, vector database 120 stores a table that includes a column for storing vectors and one or more column for storing user data, such as a column for storing a user identifier, a column for storing a user profile, a column for storing user search history, a column for storing user access history, a column for storing user-generated content, etc. In this example, each row in the table corresponds to a user, such as a customer, a subscriber to a service, etc.

Vector database 120 may also store one or more indexes that index content in vector database 120, such as content stored in one or more base tables. Some of the indexed content may be vector-related data (e.g., actual vector embeddings and metadata thereof) and some of the indexed content may be non-vector-related data, such as content in columns that do not store vectors. Thus, at least one index that vector database 120 may store is a vector index, described in more detail herein.

Vector Storage

Because vectors that are produced by a ML model are of fixed length, an optimal type is used for underlying storage. For example, for vectors that are less than 8K elements in length, RAW may be used, which should handle most use cases. For larger vectors, binary large object (BLOB) may be used. BLOB should not be used for small vectors due to fixed overhead of LOBs. However, whether BLOB or RAW is used has no effect on the user interface.

In an embodiment, additional summary data may be kept within a vector in order to accelerate operations. For example, the squared norm of a vector (Sum($v^2$)), which is required for distance calculations, may be stored in a header of the vector. A vector may require additional metadata, such as vector version number, whether the vector stores IEEE floats or binary floats, etc.

Vector Queries

A "vector query" is a query that targets one or more vectors in a vector database, such as vector database 120. Vector database server 110 receives a vector query, generates an execution plan for the vector query, and processes the execution plan in order to retrieve one or more vectors from vector database 120. A vector query typically includes a "query vector" and, optionally, one or more other search criteria. A query vector is a vector that vector database server 110 uses to identify one or more vectors in vector database 120. Examples of one or more other search criteria include dates, numbers, strings, etc. For example, a vector query may ask for the top five matching vectors that are associated with the state of California and a date range between Feb. 1, 2024 and Mar. 5, 2024. Such other search criteria may comprise data from columns that are part of the same table that includes the vector column that stores the vectors that the vector query targets.

In order to identify vectors that are similar to a query vector, vector database server 110 may compare the query vector to each vector stored in vector database 120. However, comparing a query vector to each vector in vector database 120 may take a significant amount of time that users are not willing to wait in order to receive an answer. Also, performing such a naïve scan of vector database 120 given a query vector may require a significant amount of computer resources that could be used for other tasks. To address these problems, a vector index may be generated and used in query vector processing.

Vector Indexes

Currently, similarity searches are often performed on data sets with billions of vectors (i.e., vector embeddings). For example, the Deep1B dataset contains 1 billion images generated by a Convolutional Neural Network (CNN). Computing VECTOR_DISTANCE with every vector in the corpus to find Top-K matches at 100% accuracy is very slow. As a result, approximate vector indexes are used to trade-off search quality (recall/accuracy) for search speed.

Vector indexes tend to group data based on vector similarity with the search restricted to a few groups, achieving significant data pruning. Vector similarity is defined in terms of vector_distance( ) calculations. A goal is for a vector index to fit in memory (as opposed to only in slower, long-term (e.g., non-volatile) storage, such as disk) to allow for fast traversals and scans. With modern techniques and memory capacities, a index for billions of vectors can fit into volatile memory. Memory in modern computing machines is large enough for all but the largest workloads of giant web companies.

Two types of vector indexes that may be used to index vectors include Hierarchical Navigable Small Worlds Index (HNSW) and Inverted File Index (IVF). HNSW is an in-memory graph that is fast and relatively accurate, but it is larger in size than IVF. IVF is slower and less accurate, but it is smaller in size. Product Quantization (PQ) is a lossy compression technique that may be used to reduce the size of a vector index so that the index may fit into memory or be scanned faster. However, a tradeoff of PQ is lower accuracy. HNSW and IVF may be combined (with or without PQ) to optimize both speed and size.

Covering Columns

A covering column is a column, of a base table, whose data is stored in a vector index, which indexes the vector column of the base table. A vector index may store multiple covering columns of a base table. A covering column enables vector index-only access plans by avoiding a lookup of the base table in order to retrieve data from the covered column. For example, without a covering column in a vector index, if a vector query is received that includes a predicate on that column (e.g., "tab.col2>9") as well as query vector, then both the vector index and the corresponding base table would have to be searched. The vector index would be searched based on the query vector and the base table would be searched based on the predicate. The results of both searches would be joined based on row identifier (since the vector index includes a row identifier for each indexed vector and each row in the base table is associated with a unique row identifier). In contrast, with a vector index that includes a covering column for a predicate of a vector query, neither the search of the base table nor a subsequent join are required. This preserves significant computing resources, including CPU and memory.

A predicate may be a relational predicate or a JSON predicate. A relational comprises a name of a column, an equality operator (e.g., =, !=, >, ≥, <, ≤), and a value. The value of a predicate is of the data type of the corresponding column in the base table, such as NUMBER, DATE, STRING, or BOOLEAN. A JSON predicate comprises a name of an element in JSON document, an operator (e.g., CONTAINS), and a value, such as a text or string value.

Covering columns are used to accelerate three main use-cases. In a first use case, covering columns are used to perform efficient single-stage filtering (or in-filtering) during vector index search. For example, "fetch Top 10 similar houses to this query image where price >1M USD" where the "price" column is stored as a covering column. As another example, the vector query may be as follows.

```
Select a from tab1, tab2, tab3 where
Tab1.b=tab2.b and tab2.c=tab3.c and tab3.d>2
Order by vector_distance(tab1.vector_column,
  input_vector)
Fetch first 2 rows only
```

In this example vector query, this multi-join uses covering columns from tab1 to optimize query execution.

In a second use case, covering columns are used to enable efficient grouping operations. For example, "Fetch Top 10 similar houses to this query image with at most 1 house per zipcode" where the "zipcode" column is stored as a covering column. A third use case is unique to covering columns in a HNSW index. In a third use case, covering columns are used to perform pre-filtering. A current approach to performing pre-filtering (in the HNSW context) with a covering column would be to apply the filter while scanning the base table and then join the results of the scan with a rowid-VID table to get the passing VIDs. Then a bitmap of the passing VIDs is constructed and the HNSW graph is scanned with this bitmap. Thus, when a vertex is evaluated to determine if it passes the filter, instead of going to the base table, the bitmap is consulted. To optimize pre-filtering, in an embodiment, the entire set of covering columns is scanned in memory and the passing vids are identified directly. This avoids (1) a full scan of the base table and (2) a join with the rowed-vid table.

Example syntax of creating a vector index with a covering column is as follows:

```
create vector index house_idx on HOUSES (house_vec)
  INCLUDE (price)
```

Process Overview

Figure 2:
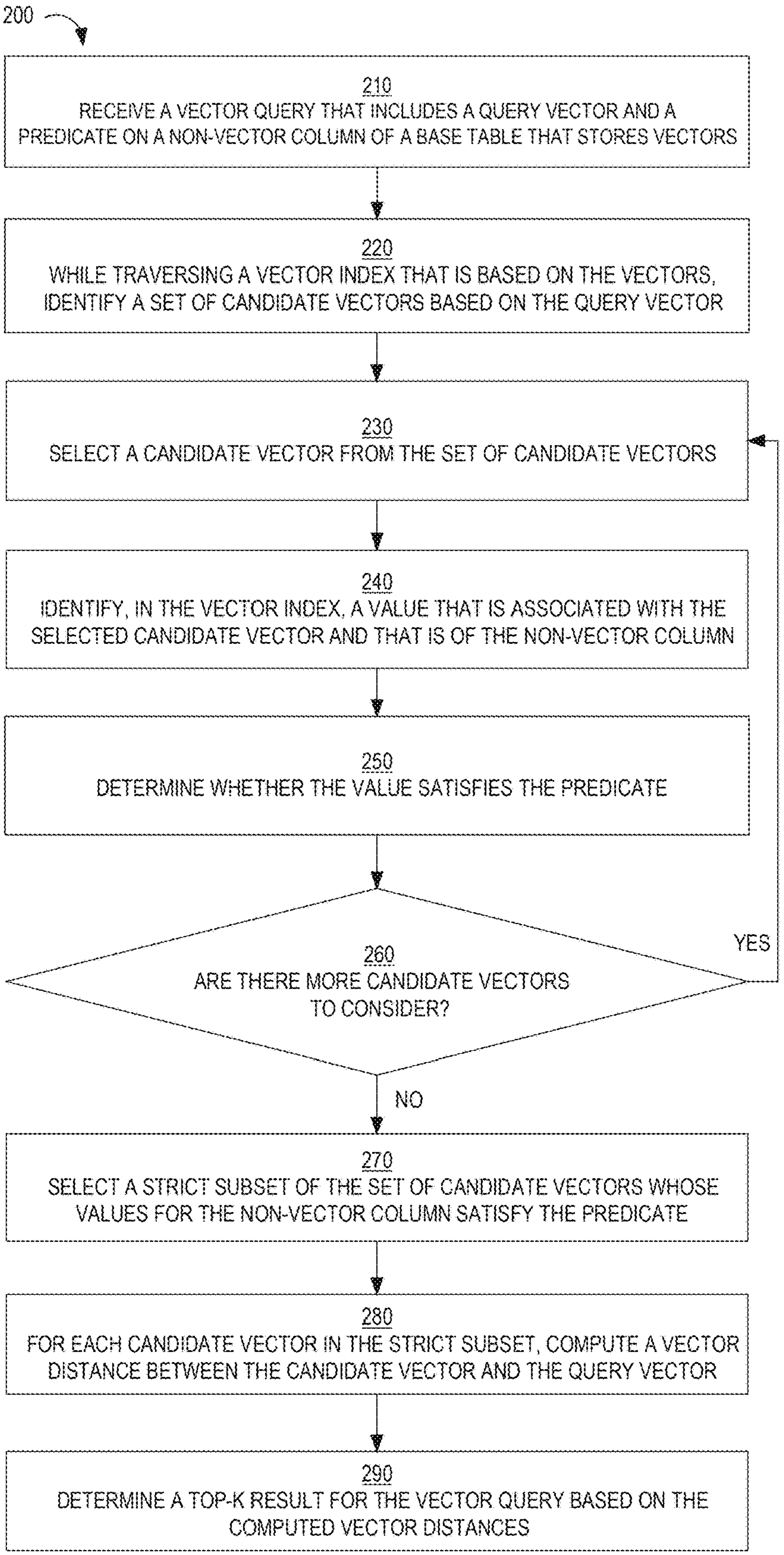
FIG. 2 is a flow diagram that depicts an example process for processing a vector query with a predicate, in an embodiment.

FIG. 2 is a flow diagram that depicts an example process 200 for processing a vector query with a predicate, in an embodiment. While process 200 implies that the blocks are performed in a particular order, all embodiments are not so limited. For example, predicate evaluation may occur prior to selecting a set of candidate vectors.

At block 210, a vector query that includes a query vector and a predicate on a non-vector column of a base table that stores a plurality of vectors is received.

At block 220, in response to receiving the vector query and while traversing a vector index that is based on the plurality of vectors, a set of candidate vectors are identified based on the query vector.

At block 230, a candidate vector is selected from the set of candidate vectors.

At block 240, a value, associated with said each candidate vector, for the non-vector column is identified in the vector index.

At block 250, it is determined whether the value satisfies the predicate. Block 250 may involve storing predicate satisfaction data that indicates that the value satisfies the predicate. Such predicate satisfaction data may be used later to identify all candidate vectors whose associated covering column values satisfy the predicate.

At block 260, it is determined whether there are any more candidate vectors to consider. If so, then process 200 returns to block 230 where another candidate vector is selected. Otherwise, process 200 proceeds to block 270.

At block 270, a strict subset of the set of candidate vectors is selected whose values for the non-vector column satisfy the predicate. Block 270 may be performed by determining whether each candidate vector is associated with predicate satisfaction data.

At block 280, for each candidate vector in the strict subset, a vector distance is computed between that candidate vector and the query vector. While FIG. 2 implies that the vector distance is computed after a set of candidate vectors are considered, block 280 may be performed serially, such as immediately (and singly) after it is determined, in block 250, that a candidate vector is associated with a covering column value that satisfies the predicate. Then, each vector distance is stored in memory until no more vector distances can be computed; after which the computed vector distances may be sorted in order to perform a top K operation in the next block.

At block 290, a top K result for the vector query is determined based on the computed vector distances. Block 290 (or block 280) may involve ordering the computed vector distances in (e.g., descending) order and selecting the top K of the ordered vector distances.

In embodiments, vector distances are computed for candidate vectors before the predicate is applied to their corresponding covering column values. This is described in more detail herein.

The following description is divided into two parts: one part (comprising multiple sections) on implementing covering columns in the IVF context and the other part (also comprising multiple sections) on implementing cover columns in the HNSW context.

Vector Index: IVF

An IVF index is based on K-means clustering or partitioning. A K-means clustering algorithm is applied to a set of vectors to generate K partitions. The value of K (or the number of partitions) may be based on the number of vectors. For example, K=sqrt(N), where N is the number of vectors. Each partition is identified by a centroid, which is a value that is conceptually the average of the vectors that are assigned to that partition. The centroid of a partition may be considered the "center of gravity" of the partition. A goal in determining a centroid is to minimize a total distance between vectors within a partition and their centroid, so that each centroid is a good representative value for its partition.

Figure 3:
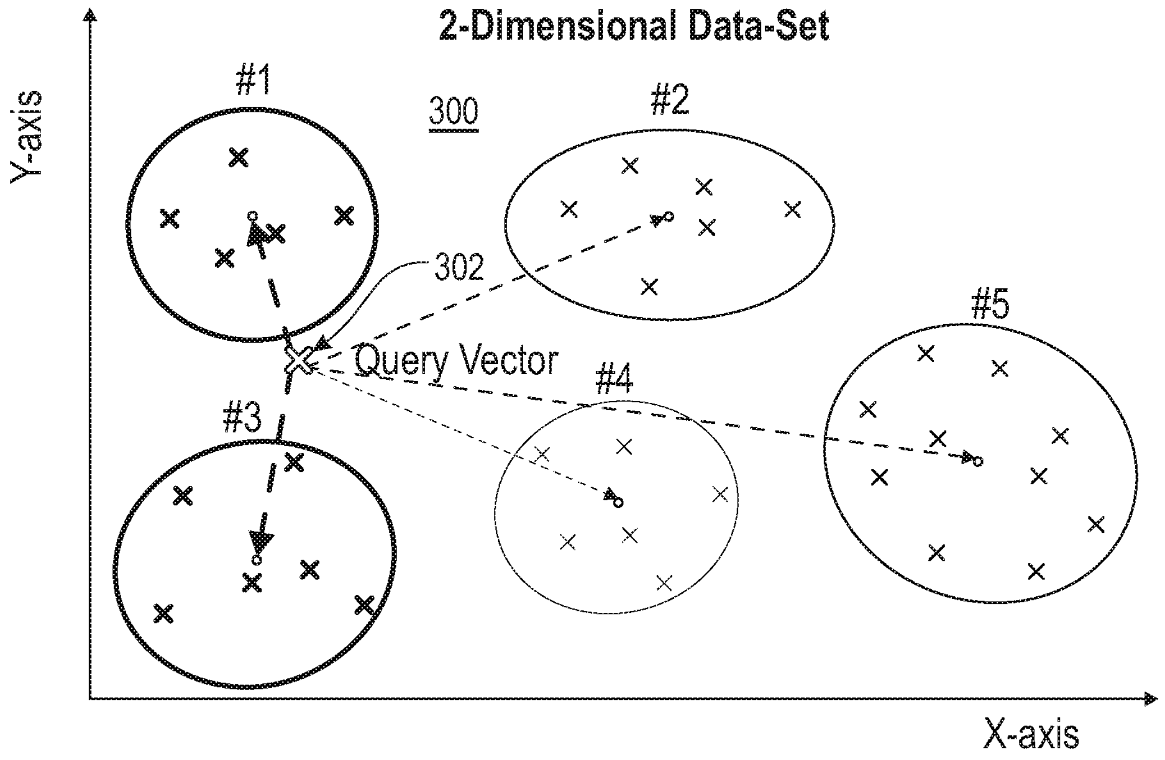
FIG. 3 is a diagram that depicts an example set of five clusters that is generated based on a clustering algorithm, in an embodiment.

FIG. 3 is a diagram that depicts an example set of five clusters 300 that is generated based on a clustering algorithm, in an embodiment. In this example, vectors are two-dimensional and, therefore, may be mapped onto a two-dimensional plane with an X-axis and a Y-axis. However, some vectors may have hundreds of dimensions. FIG. 3 also depicts a query vector 302 that is not in any of the five clusters 300.

An IVF index comprises two types of tables: (1) a centroids table that stores all the centroids of all the partitions; and (2) K partitions table, each partition of which stores the vectors that are assigned to that corresponding partition based on closeness to the centroid represented by the partition. In a similarity search, given query vector 302, the centroids table is searched first (referred to as the "first-level search") to identify one or more centroids that are the most similar to (or has the lowest distance to) query vector 302. Thus, either only a single centroid is selected from the centroids table or multiple centroids are selected from the centroids table. The number of centroids to select may be a default value (e.g., two) and/or may be based on vector distance from the query vector. (For example, select the closest three centroids that are within D vector distance from the query vector.) In the example of FIG. 3, a vector distance calculation is performed for each pair of vectors, each pair comprising query vector 302 and a different centroid of clusters 300. Because there are five clusters 300, five pairs are considered and five distance calculations are performed.

Figure 4:
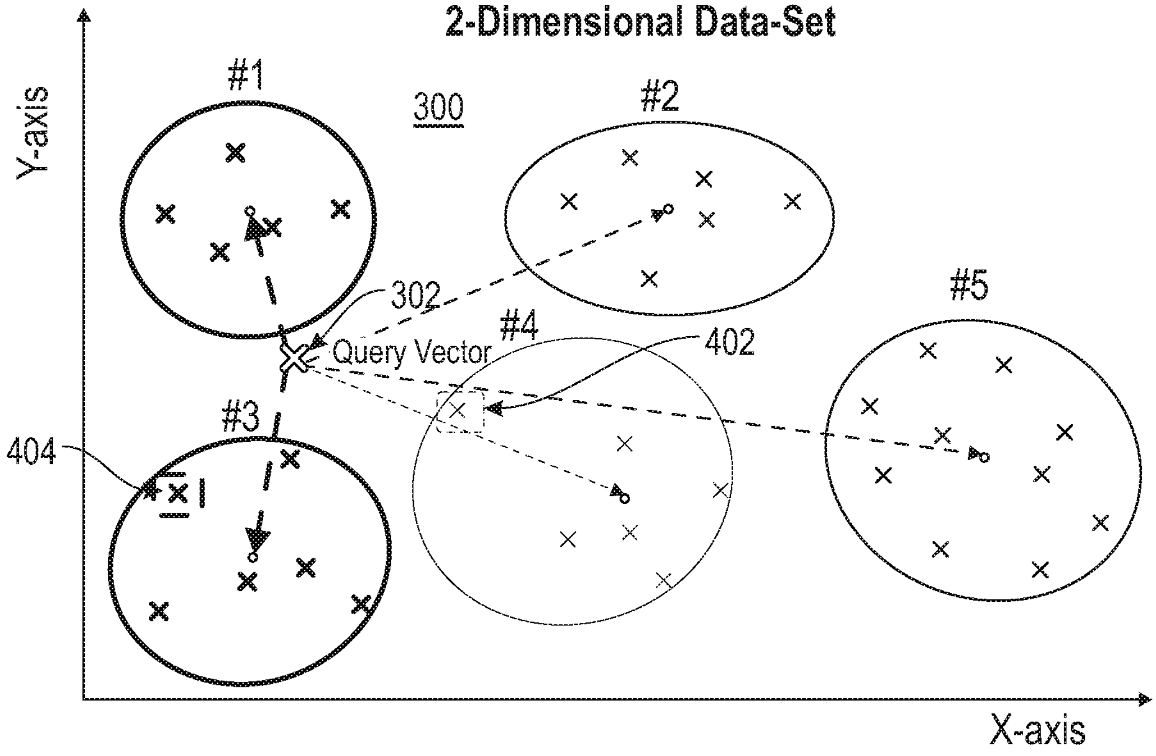
FIG. 4 is a diagram that depicts a subset of clusters that are selected based on distance calculations between a query vector and centroids in the clusters.

FIG. 4 is a diagram that depicts a subset of clusters that are selected based on distance calculations between query vector 302 and centroids in clusters 300. In this example, two clusters are selected, which may be due to a threshold distance that each distance between a query vector and a corresponding centroid must be under in order to be considered a candidate cluster to search. Additionally or alternatively, two clusters are selected due to a pre-defined number of centroids to select ("n-probe"). In this example, the centroids in clusters #1 and #3 are selected from among the five centroids in clusters 300. However, because cluster #4 is not part of the second-level search, vector 402 cannot be considered a candidate vector. Also, vector 404 can be selected as a candidate vector, even though vector 402 is closer to query vector 302 than vector 404.

Then, for each selected centroid, the partition to which that identified centroid belongs is searched to identify one or more vectors. This search is referred to as a "second-level search." If the query vector is for the Top K, then the Top K vectors in each identified partition are identified and then the Top K from the Top K of each identified partition are selected. Even if the query vector is closer to a centroid associated with one partition, the closest vector to the query vector may be in another partition. Thus, searching one partition might not be sufficient for an accurate search; searching multiple partitions is generally prudent.

However, in an embodiment, the closer that a query vector is to the closest centroid, the fewer partitions are considered in the second-level search. A measurement of closeness of a query vector to the closest centroid may be based on one or more distances between the query vector and one or more vectors in the partition of the closest centroid and/or one or more other centroids. For example, if a query vector is over three times closer to the closest centroid than to a particular centroid, then the partition that corresponds to the particular centroid is not searched in the second-level search, neither any partition whose centroid is farther from the query vector than the particular centroid. As another example, if a query vector is closer to the closest centroid than the query vector is to over 50% of the vectors in the partition that corresponds to that centroid, then no other partition is searched.

IVF Index: Covering Columns

In an embodiment, a covering column is added as an additional column to the partitions table. During query execution, the number of partitions ("nprobes") (of the partitions table of an IVF index) to scan may be determined based on the closeness of their respective centroids to the query vector. While scanning the partitions in the partitions table, the one or more covering column filters are also evaluated in addition to vector distance. If a predicate column is not covered in a vector index, then one of multiple approaches may be implemented. In one approach, the results of the index search would be joined with the results of applying the predicate on the base table. If there is a first predicate on a covering column and a second predicate on a non-covering column, then the first predicate may be applied in an in-filter way while traversing the vector index and the results of that application may be joined with the result of applying the second predicate on the base table. However, this approach may result in less rows coming out of the join since the returned top K rows from the centroid partitions table may not pass the second predicate. Another approach is to not perform the covering column rewrite optimization. For example, both filter predicates are applied to the base table in a pre-filter fashion and the results thereof are joined with results of an index search.

In the scenario where one or more covering columns are evaluated in addition to vector distance, for the vectors that pass the relational filter, the running Top-K result is computed. The filter predicate on the covering column is applied as an "in-filter" during the IVF index scan. Such application may be performed using one of multiple filtering techniques. In a first filtering technique, each vector in a selected partition is considered sequentially. For each vector, before a vector distance is computed between that vector and the query vector, the filter predicate is applied to the value of the corresponding covering column value for that vector. If the filter predicate is true, then the vector distance is computed; otherwise, the vector distance is not computed. Thus, in this first filtering technique, many vector distance computations may be avoided.

In a second filtering technique, a non-vector index (e.g., a B-tree index) is created on the covering column. Such an index may be created for each partition in the partitions table of the IVF index. Thus, given a query vector and a set of selected partitions, the index associated with each selected partition in the set of selected partitions is identified and searched, given the predicate from the vector query. In this way, each vector in a selected partition does not need to be scanned. This second filtering technique is a type of pre-filter approach, as opposed to an in-filter approach where the filter predicate is applied to a covering column value right before the vector distance is computed for the corresponding indexed vector. This second filtering technique is useful when the predicate is highly selective, meaning few rows match the predicate. If the predicate is not highly selective, then the first filtering technique (or the third filtering technique) may be faster. In an embodiment, a query processor determines the selectivity of a predicate and uses that selectivity to select a filtering technique from among multiple candidate filtering techniques.

In a third filtering technique, a vector distance is computed for each of multiple vectors before applying the filter predicate to any row in a partition. Such a vector distance computation may be implemented using a SIMD (single instruction, multiple data) instruction that involves computing relatively many vector distances in the same time to compute (using traditional code instructions) a single vector distance (or two vector distances sequentially). After multiple (e.g., 256) vector distances are computed, then the filter predicate is applied to the corresponding covering column values of the corresponding vectors. In a related technique, vector distance computations are pushed down to a storage layer (e.g., such as Oracle Exadata™) rather than at a server layer, for faster vector distance computations.

IVF Index: Covering Columns—Insufficient Results

It is possible for a filter predicate to prune out enough rows, such that K rows cannot be returned from the IVF index scan. There are at least three options at this point. One option is to return less than K rows as a result of the vector query. Another option is to re-execute the vector query against the vector index, but with a higher value of nprobes to ensure more partitions are scanned. The number of partitions to consider in a subsequent index scan may be based on (a) the number of rows that were returned as a result of the initial index scan and/or (b) the number of the partitions in the first index scan. For example, if the number of rows returned is 40% of K and the number of partitions that were scanned in the first index scan is P, then the number of partitions to scan in the second index scan may be based on the following calculation: [1/(100%−40%)]*P.

As a third option, instead of re-executing the vector query (meaning that the initial partitions that were just scanned are scanned again), a resumption of the index scan proceeds with one more additional partitions, which partitions are ordered by the vector distance of those partitions' centroids to the query vector. (Thus, the original results that are less than K in number are retained in (e.g., volatile) memory and stored there for later use.) The one or more additional partitions may be identified based on a previous search of the centroids table (so that the centroids table does not need to be searched again), which previous search resulted in an ordered list of centroids that is ordered (e.g., in descending order) by the centroids' respective vector distances to the query vector. The next closest centroid in the ordered list (after the centroids that were selected as part of the initial scan of the partitions table) is identified and its corresponding partition in the partitions table is selected. After one or more additional selected partitions are scanned, the total number of rows that would be returned is compared to the value of K. This total includes the rows from the initial index scan and the rows from the subsequent index scan. If the total number of rows is greater than or equal to K, then the index scan terminates, meaning no more centroids need to be identified and no more partitions need to be scanned. If the total number of rows is still less than K, then the index scan continues with the next one or more partitions of the partitions table whose centroids are the next closest to the query vector as a result of the initial scan of the centroids table.

Vector Index: HNSW

HNSW is a multi-layer in-memory graph index that has relatively high speed and accuracy relative to IVF and other vector indexes. The graph index comprises vertices, each vertex corresponding to a vector. The lowest layer of the graph contains vertices of all of the vectors in the indexed data set. Higher layers of the HNSW index have a decaying fraction of the vertices in the layer below. In each layer, vertices are connected to their approximate M closest neighbors using edges that are used to walk the graph. At the lowest layer ("layer 0"), the number of neighbors of each vertex may be different than the number of neighbors of each vertex at higher layers, such as 2M. The vertices at higher layers are on average much farther from each other (relative to lower layers) and, therefore, allow traversal of long distances.

Two major parameters for HNSW index construction are M and R. "M" is referred to as the "neighbor count" and is the number of neighbors that each vertex is connected to on each layer. Layer 0 (the lowest layer) may have double that number (e.g., 2M neighbors). A probability distribution function may be defined based on M in order to determine whether a vertex is to be inserted in a layer that is above the lowest layer. The probability distribution function is such that probabilities decay with higher layers. When the probability drops below 1e−9, then no more layers are added. An example probability distribution function is $$p(\text{Layer}) = (1 - 1/M)/M^\wedge\text{layer}$$

Regarding parameter R, when a new vertex (corresponding to a new vector) is inserted into an HNSW index, a random number R between [0.0, 1.0] is generated. A new vertex is always inserted into layer 0. A new vertex is inserted into higher layers up to layer "i" if:

$$R > p(i-1) + p(i-2) + \dots\ p(0)$$

In an example, with M=10, if R=0.991, then the new vertex is inserted in layers 0 and 1.

An HNSW parameter that is used only for construction is referred to as "efConstruction" and refers to the number of vertices to consider within a layer when looking for the closest M vertices (or closest 2M vertices in layer 0) to which to connect a new vertex. Larger values for this parameter improve index quality but slow down construction. An example value for this parameter is 2M (or 4M for layer 0).

An HNSW parameter that is used in searching is referred to as "efSearch" and refers to the number of vertices to remember in each layer when searching for the K nearest neighbors in a top-K search. Larger values of this parameter improve search quality but slow down searches. An example value for this parameter is 2*K (or double the number of desired K matches).

Figure 5:
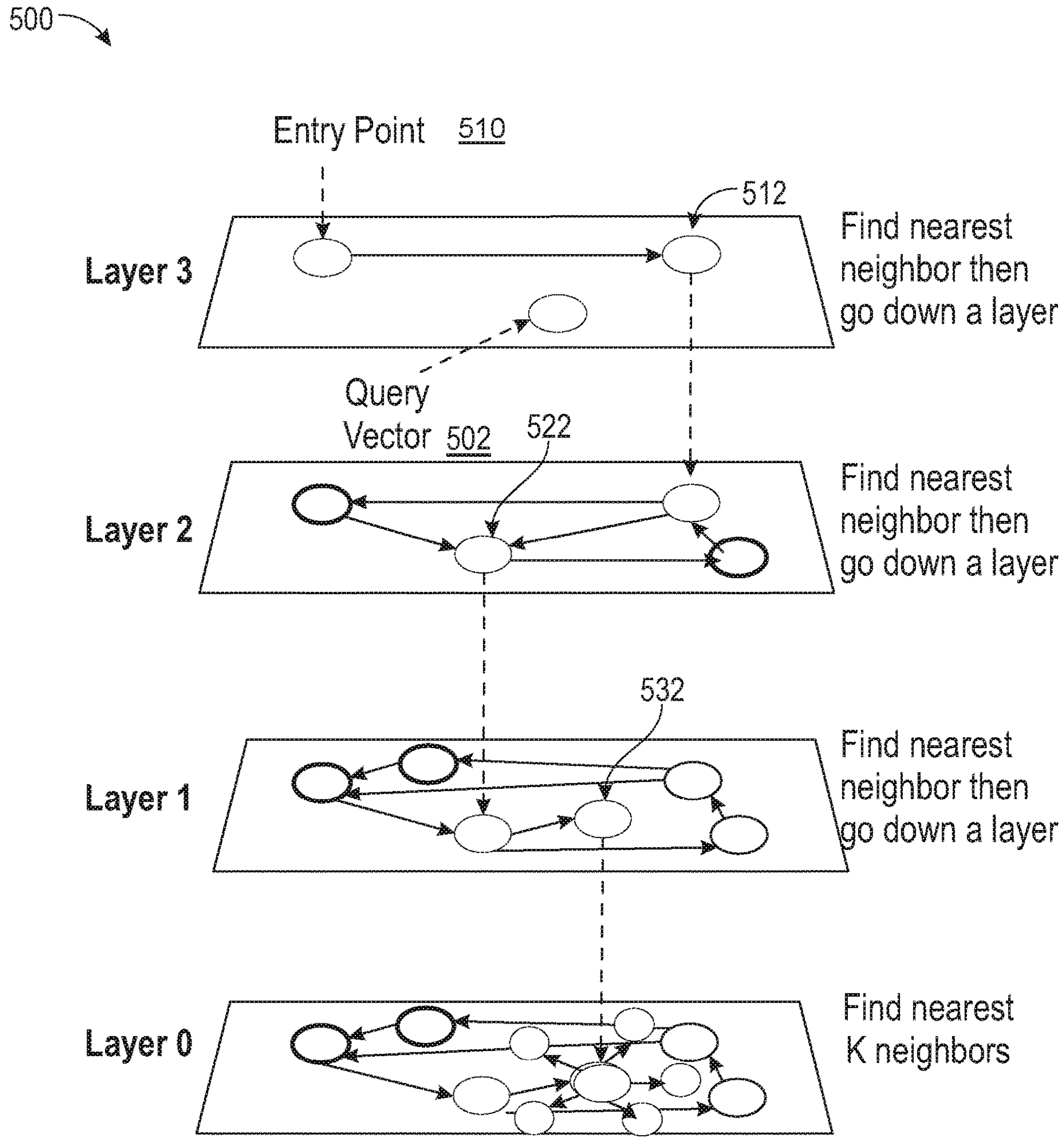
FIG. 5 is a diagram that depicts an example logical representation of an HNSW index that comprises four layers, in an embodiment.

FIG. 5 is a diagram that depicts an example logical representation of an HNSW index 500 that comprises four layers, in an embodiment. An index search begins from an entry vertex 510 in the top layer (layer 3) and traverses edges looking for the vertex, in that layer, whose vector is nearest query vector 502. If M is 32, then 33 distance calculations are performed between query vector 502 and (i) the vertex of entry vector 510 and (ii) 32 neighbors of entry vector 510. The search process does not only consider neighbors of the entry vector 510, the search process finds the closest neighbor and computes distances for its neighbors as well. This process continues until all the neighbors of a vertex are further from the query vector than the vertex that was used to arrive in that neighborhood. Once the closest vector to query vector 502 in a layer is found (i.e., vertex 512 in this example), the search continues starting with that vertex in the next layer down. This process repeats for each intermediate layer of HNSW index 500. (Thus, vertex 522 is selected in layer 2 and vertex 532 is selected in layer 1.) The index search completes in the lowest layer (i.e., layer 0) by considering the (e.g., 2M) neighbors of vertex 532, in the lowest layer, whose vectors are closest to query vector 502.

For traversing the lowest layer, two heaps are maintained: a candidates heap and a Top K heap. The candidates heap stores vertices that are candidates for further exploration and are ordered based on distance to the query vector. The Top K heap stores the current best Top K result set so far. The Top K heap holds efSearch vertices. The search proceeds as follows. Vertex 532 is at the top of the candidates heap and all its 2M neighbors are below it in the candidates heap, ordered by distance to query vector 502. Vertex 532 is selected and compared against all vertices in the Top K heap (which is initially empty). The goal is to check whether a vertex popped from the candidates heap can beat the worst vertex (in terms of distance to the query vector) from the Top K heap (which is also a priority queue ordered in reverse, i.e. furthest vertex among the efSearch vertices is at the top of the Top K heap). If the best candidate vertex beats the worst vertex from the current Top K heap, then the best candidate vertex is added to the to the Top K heap and the worst vertex is removed from the Top K heap. The search continues, meaning more candidates are explored. When vertex 532 is selected, the Top K heap is empty, so vertex 532 is automatically added to the Top K heap.

In a scenario where the Top K heap is full (i.e., it contains efSearch vertices), when a vertex V is selected from the candidates heap, the worst vertex in the Top K heap is replaced by V if V beats that worst vertex. All neighbors of V are then added to candidates heap and ordered within the candidates heap, and the next best vertex in the candidates heap is selected and the search continues. The search terminates if the current best candidate in the candidates heap cannot beat the worst vertex in the Top K heap. Increasing efSearch gives us accuracy because it is more likely for a candidate vertex to be better than the worst vertex in a set of one hundred vertices in the Top K heap than for the candidate vertex to be better than the worst vertex in a set of ten vertices. Thus, with larger values of efSearch, the exploration goes on longer.

HNSW Index: Covering Columns

In an embodiment, a filter predicate is applied to a vertex during a scan of an HNSW index, given a query vector of an approximate nearest neighbor search (ANNS) (i.e., "vector query"). During the HNSW Top K graph traversal, the filter predicate is evaluated "in-line." Each vertex is associated with a row identifier (that references a row in the base table), a vector from the base table, and one or more covering column values. Thus, each vertex may be associated with a single covering column value (corresponding to a single column in the base table) or with multiple covering column values (corresponding to multiple columns in the base table).

In an embodiment, the filter predicate is applied before a vertex is added to the candidates heap. However, this embodiment will lead to rejection of an entire neighborhood if a vertex's covering column does not pass the filter predicate. This rejection may lead to a faster search, but may reduce the quality of the search results, especially if the filter predicate is not correlated with the graph edges. It is possible that a neighbor might satisfy the filter predicate even though the current vertex does not satisfy the filter predicate. This neighbor might never be reached if this embodiment is implemented. In another embodiment, the filter predicate is applied before a vertex is moved from the candidates heap to the Top K heap. For example, a query processor selects a vertex from the candidates heap and, before determining whether the vector distance (associated with the vector of that vertex) is less than the highest vector distance in the Top K heap, applies the filter predicate to the covering column value associated with that vertex.

In either embodiment, during application of a filter predicate, the covering column value associated with the vertex ID of that vector is looked up and the filter predicate is evaluated. If an ANNS includes multiple filter predicates, then multiple filter predicates may be applied at the same time, as long as the corresponding columns are covering columns, meaning the values in those columns are stored in the HNSW index. If a vertex does not pass a filter predicate, then the vertex is ignored. If the covering column value is not stored in the in-memory HNSW index structures, then a join back query would need to be performed to fetch the value from the base table. In-filtering is still possible with a join back query, but such filtering will not be as fast as retrieving the covering column value directly from the HNSW index.

In an embodiment, to facilitate fast retrieval of a covering column value, each vertex ID points to the covering column value for that vertex, similar to pointing to the vector that represents the vertex.

In a related embodiment, when an HNSW snapshot is created (whether the first snapshot of the HNSW index or a subsequent snapshot of the HNSW index), the covering column (in the snapshot) is populated alongside vector values in separate (e.g., 1 MB) buffers. Each buffer has a header that represents how many vertex IDs (rows) have their covering column values in this buffer, and how many covering columns per row are stored. For all vertices, the same covering columns are stored.

The following is an example row format that may be used to store all covering columns for each vertex in an HNSW index.

<CLA stride (default 1)> <CLA entries (num_covering_columns/cla_stride+1> <Length array for column values in $1^{st}$ stride> <Data values for columns in $1^{st}$ stride> <Length array for column values in $2^{nd}$ stride> <Data values for columns in $2^{nd}$ stride> . . .

An example of this format is as follows:

⟨Stride = 1⟩ |0, 4, 9| John, Smith where 0 points to (or references) the start: J (from John); 6 points to the start of the next word: S (from Smith); and 9 points to the total length: (John+Smith).

The CLA (Cumulative Length Array) can be used to quickly jump to a stride containing the column of interest, and then the length vector is used to iterate to the column of interest within the stride.

Instead of this row format, a column format is also possible. However, since the Top K traversal requires accessing the covering column values for a vertex (e.g., that is moving from the candidates heap to the Top K heap), it is suboptimal to do a point lookup within a column format, although the column format offers better compression than the row format.

In an embodiment, the algorithm for applying a filter predicate during an HNSW index traversal is modified to first evaluate the filter predicate on a columnar representation of covering column values, resulting in the generation of a VID filter of passing rows, which could then be queried during the Top K traversal of the HNSW index. This is similar to delete filter generation and consultation. However, this embodiment may end up evaluating the filter predicate on many more rows than the number of rows that the filter predicate would be applied to vertices before they are added to the Top K heap during traversal of the HNSW index.

In an embodiment, transactional consistency of covering column values is ensured. One way to achieve transactional consistency of covering column values is through multi-snapshot design. Each HNSW snapshot stores the covering column values of the vertices (rowids) as of the snapshot build timestamp (e.g., a system change number (SCN)). Private journal and shared journal structures track modifications to covering column values as well. This means that the change log table in the shared journal will have additional columns to track covering column information. For an update to a covering column value, a new opcode of "Update" may be introduced. (Vector updates may be tracked as deletes followed by inserts.) Instead of reflecting an update to a covering column value as a delete followed by an insert (in effect, adding a new vertex), an optimization involves performing an in-place update for the covering column value.

During ANNSs, in addition to a delete filter, a new covering column filter may be created. This filter contains the list of all vertex IDs from the shared journal and the private journal that do not pass the filter predicate (evaluated against the covering column(s)). This covering column filter may be part of the delete filter, which identifies vertex IDs of vectors that have been deleted and, therefore, should not be returned in a final result. During the Top K traversal, when a vertex is considered for movement from the candidates heap to the Top K heap, the filter predicate is applied to the covering column. If the vertex ID does not pass the filter, then the vertex is ignored, and the exploration continues. For the running Top K computation on new inserts and new updated values, the covering column filter is added. Only those vectors are considered that pass the filter predicate. Thus, consistent read semantics are guaranteed for HNSW indexes with covering columns.

There are three main approaches to processing updates to covering column values in an HNSW index. In one approach, an update is represented, in a shared journal, as a delete followed by an insert. The changes reflected in a shared journal are accessible/visible to other transactions/vector queries. This does not require changes to augment the delete filter. However, on snapshot construction, this would require a delete followed by an insert in the graph for the latest snapshot. In a second approach, an update in a shared journal (i.e., replacing an old value for a new value) requires additional augmentation of the delete filter at query time. However, this approach is easier on snapshot maintenance because just the covering column value is updated. In a third, hybrid approach, an update is reflected, in a shared journal, as an insert followed by a delete. This allows the query process to avoid the step where the delete filter is augmented with values that do not pass the filter. However, while propagating the insert followed by delete to the graph, the old vector is not deleted and then reinserted in the graph. Instead, because this is just an update of a non-vector value, only the covering column storage space is updated with the updated value.

Transactional Maintenance

Transactions that modify values in a base table should be reflected in a vector index. In an embodiment, a change, as a result of transaction, to a covering column in a base table triggers an update to a vector index that includes data from the covering column. Examples of changes or modifications include inserts, deletes, and updates. Thus, before a transaction commits, its changes are reflected in both the base table and the vector index. For example, if home price is a covering column in a base table and the price of a particular home is updated (e.g., increased), then the corresponding row in the base table is updated to replace the old price with the updated price. Also, an entry, in the vector index, that stores the home price of the particular home is updated to reflect the updated price. In this embodiment, query processing semantics do not change because transaction changes are reflected in the vector index immediately.

In a related embodiment, instead of modifying the vector index upon a change to the base table, the change is stored in a log table. Initially, before the transaction that triggered the change is committed, the change is stored in a private change log that is private to the transaction, meaning that the change is not visible to any other transaction and, therefore, will not make decisions based on the change. Before the transaction commits, the change is stored in a shared change log that is shared with (or accessible to) other transactions, meaning that other transactions can make decisions based on the change. In this embodiment, query processing semantics change because transaction changes are not reflected in the vector index immediately. Therefore, such changes should be considered while a query vector is processed against a vector index.

A shared change log comprises multiple entries, each corresponding to a different change. An entry may include the change itself, the type of change (e.g., insert, delete, update), one or more covering column values, a vector ID (e.g., a vertex ID (in case of an HNSW index) or a row ID)

and a timestamp of when the change was committed. An update may be reflected with two entries in the shared change log: an entry that indicates a delete followed by an entry that indicates an insert. The timestamp allows time-based vector queries to be processed, where the ANNS indicates when the information should be current. For example, if a ANNS asks for data that pertains to yesterday, then changes committed before today are considered and any changes that were committed today are ignored.

In this embodiment where a shared change log is implemented, a shared change log is accessed (or data associated therewith) during the processing of an ANNS against a vector index that stores data from one or more covering columns. Given a shared change log, a delete vector may be generated that includes a list of vectors that have been deleted. The delete vector may be a bit vector where each bit corresponds to a different vector, such as by row ID or vertex ID in the lowest layer/level of an HNSW index.

Thus, a query processing engine, before identifying a top-K result given a set of intermediate results, consults a delete vector (or the shared change log) and determines whether any of the vectors in the intermediate results has been deleted. If so, then those vectors that are indicated in the intermediate results and the delete vector are removed from further consideration. Also, the query processing engine consults the shared change log to identify vectors that have been inserted. If a vector has been inserted, then the corresponding covering column value in the shared change log is checked to determine if that value satisfies the filter predicate at issue. If so, then the vector is added to the intermediate results and a vector distance computation may be performed immediately (or delayed).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
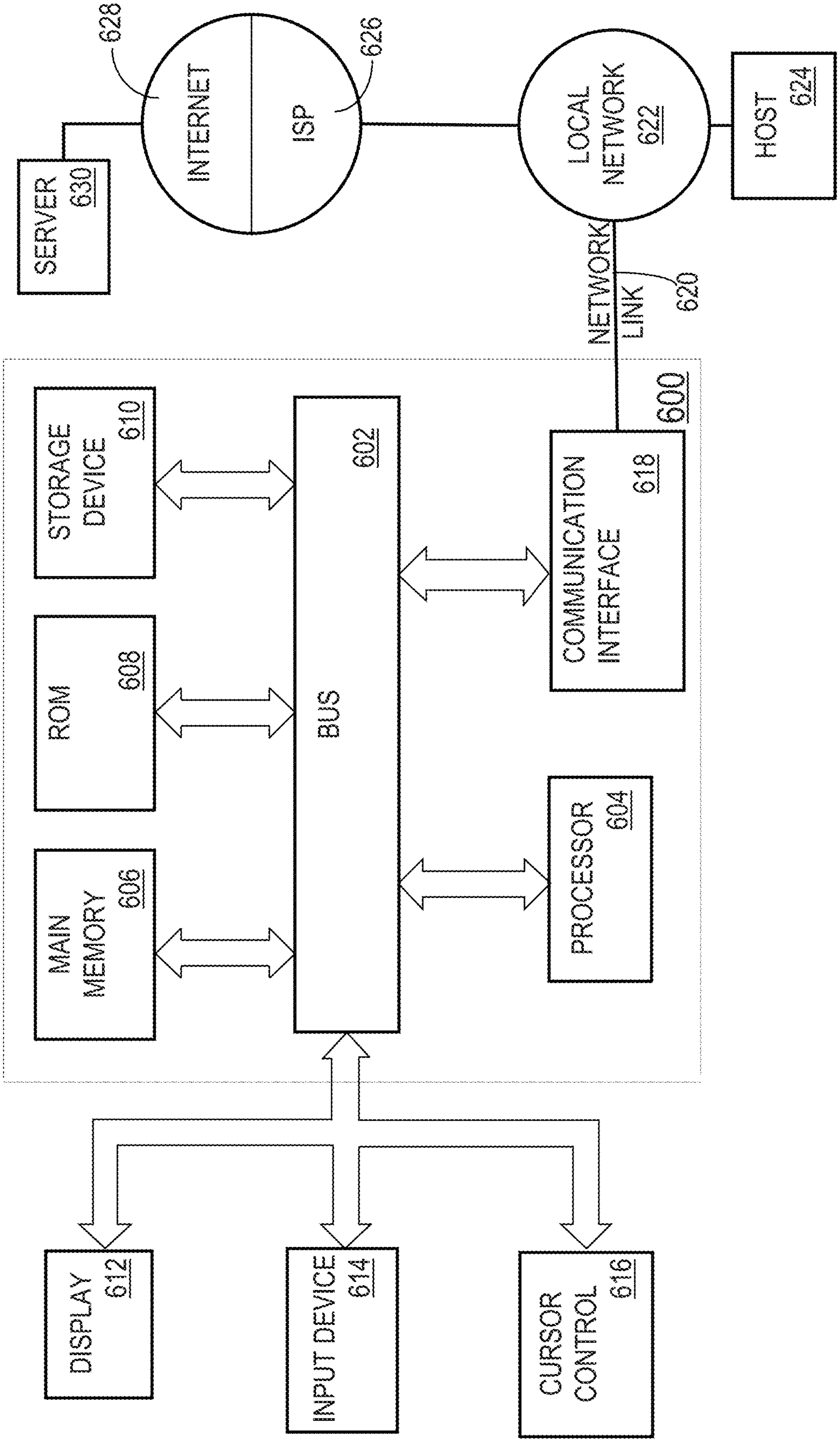
FIG. 6 is a block diagram that illustrates an example computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
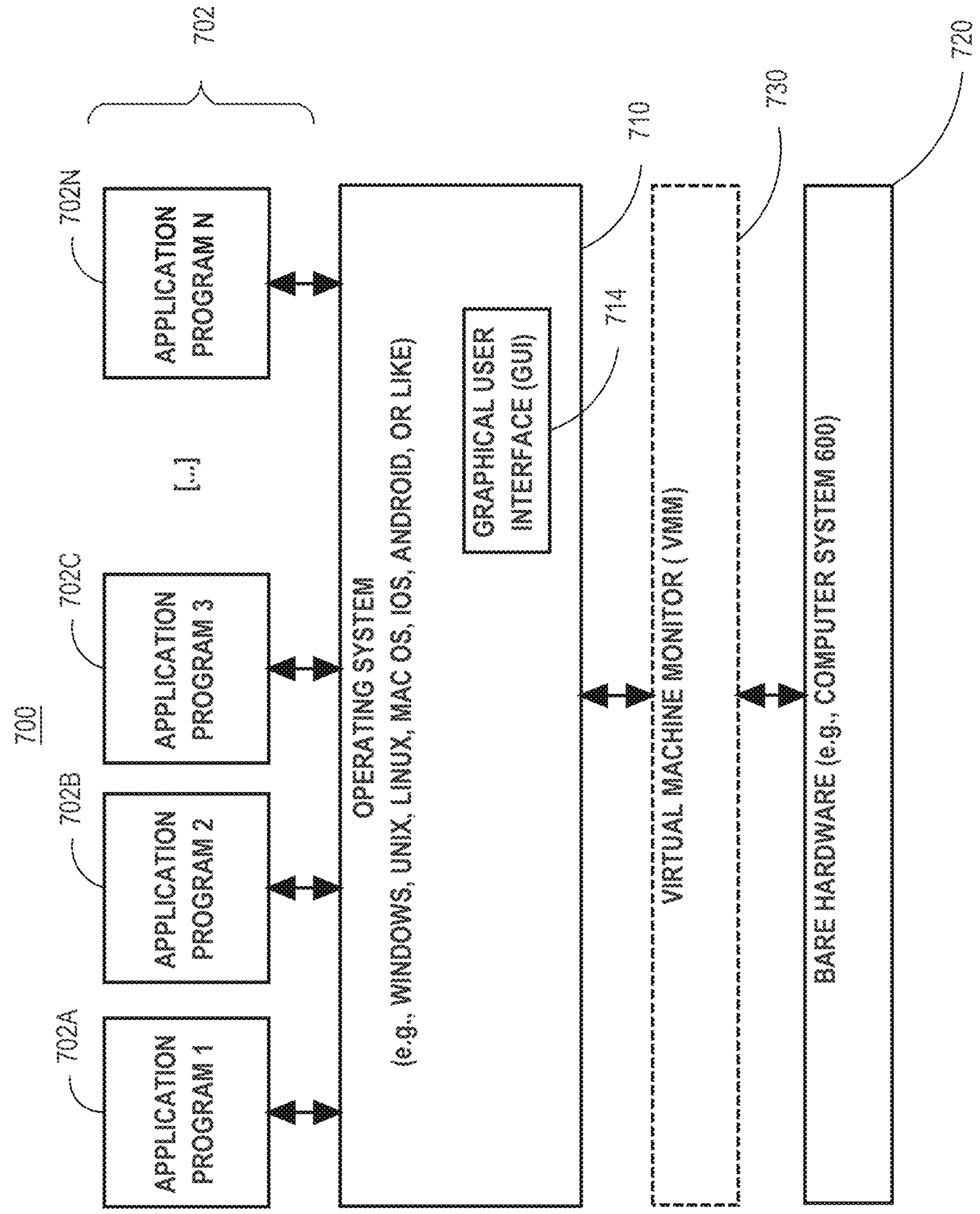
FIG. 7 is a block diagram of a basic software system that may be employed for controlling the operation of the example computer system.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving a vector query that includes a query vector and a predicate on a non-vector column of a base table that stores a plurality of vectors;

in response to receiving the vector query and while traversing a vector index, that is based on the plurality of vectors:

based on the query vector, identifying a set of candidate vectors;

for each candidate vector in the set of candidate vectors:

identifying, in the vector index, a value, associated with said each candidate vector, for the non-vector column, and determining whether the value satisfies the predicate; and selecting a strict subset, of the set of candidate vectors, whose values for the non-vector column satisfy the predicate;

for each candidate vector in the strict subset, computing a vector distance between the query vector and said each candidate vector;

determining a result of the vector query based on vector distances computed for the candidate vectors in the strict subset;

wherein the method is performed by one or more computing devices.

2. The method of claim 1, wherein:

the vector index is an Inverted File Index (IVF) index that comprises a centroids table and a centroid partitions table that stores the plurality of vectors and values of the non-vector column;

traversing the vector index comprises:

for each centroid in the centroids table:

generating a similarity score between the query vector and said each centroid;

adding the similarity score to a set of similarity scores;

identifying a strict subset of the set of similarity scores;

for each similarity score in the strict subset:

identifying a partition, in the centroids partition table, that corresponds to the centroid of said each similarity score;

wherein identifying the set of candidate vectors comprises identifying candidate vectors in the partition;

wherein identifying the value in the vector index comprises identifying the value associated with the partition.

3. The method of claim 2, wherein the value is stored in the partition, wherein the value is stored in association with a candidate vector in the partition.

4. The method of claim 2, further comprising:

storing, for each partition in the centroid partitions table, a non-vector index on the non-vector column;

wherein identifying the value in the vector index comprises traversing the non-vector index based on a predicate value in the predicate;

wherein identifying the candidate vectors in the partition is performed after traversing the non-vector index.

5. The method of claim 2, wherein identifying the partition comprises identifying a particular partition in the centroid partitions table, the method further comprising:

performing a single instruction, multiple data (SIMD) instruction on a set of multiple vectors in the particular partition, resulting in a plurality of vector distances, one for each vector in the set of multiple vectors;

after generating the plurality of vector distances, determining whether values, in the non-vector column, that correspond to the plurality of vector distances satisfy the predicate.

6. The method of claim 2, wherein the vector query is a top K query, the method further comprising:

determining whether a number of vectors in the result is less than K;

in response to determining that the number of vectors in the result is less than K:

resuming a scan of the IVF index by identifying one or more additional partitions that are ordered based on similarity scores in the set of similarity scores;

identifying a second set of candidate vectors in the one or more additional partitions;

for each candidate vector in the second set of candidate vectors:

identifying, in the vector index, a second value, associated with said each candidate vector, for the non-vector column, and determining whether the second value satisfies the predicate; and selecting a second strict subset, of the second set of candidate vectors, whose values for the non-vector column satisfy the predicate.

7. The method of claim 1, wherein:

the vector index is an Hierarchical Navigable Small Worlds Index (HNSW) index that comprises a vector table and a neighbor graph that comprises a plurality of levels that comprises a particular level comprising a graph of nodes representing neighbor relationships among vectors in the plurality of vectors;

traversing the vector index comprises, while traversing the graph of nodes:

maintaining a candidates heap and a results heap;

for each node of multiple nodes in the graph of nodes:

adding, to the candidates heap, a node identifier of said each node;

wherein identifying the value in the vector index comprises identifying the value in an entry, of the HNSW index, that is associated with the vector that corresponds to the node identifier;

determining whether to add the node identifier to the results heap only after determining that the value satisfies the predicate.

8. The method of claim 1, wherein the vector query is a top-K vector query that specifies a number of items to return, wherein the number of candidate vectors in the strict subset is equal to the number of items to return.

9. The method of claim 1, further comprising:

processing a transaction, wherein processing the transaction causes one or more changes to be made to the base table;

prior to committing the transaction, causing the one or more changes to be reflected persistently in storage.

10. The method of claim 9, wherein causing the one or more changes to be reflected persistently in storage comprises:

modifying the vector index to reflect the one or more changes; or storing the one or more changes in a shared change log that is persistently stored.

11. One or more non-transitory storage media storing instructions which, when executed by one or more computing devices, cause:

receiving a vector query that includes a query vector and a predicate on a non-vector column of a base table that stores a plurality of vectors;

in response to receiving the vector query and while traversing a vector index, that is based on the plurality of vectors:

based on the query vector, identifying a set of candidate vectors;

for each candidate vector in the set of candidate vectors:

identifying, in the vector index, a value, associated with said each candidate vector, for the non-vector column, and determining whether the value satisfies the predicate; and selecting a strict subset, of the set of candidate vectors, whose values for the non-vector column satisfy the predicate;

for each candidate vector in the strict subset, computing a vector distance between the query vector and said each candidate vector;

determining a result of the vector query based on vector distances computed for the candidate vectors in the strict subset.

12. The one or more non-transitory storage media of claim 11, wherein:

the vector index is an Inverted File Index (IVF) index that comprises a centroids table and a centroid partitions table that stores the plurality of vectors and values of the non-vector column;

traversing the vector index comprises:

for each centroid in the centroids table:

generating a similarity score between the query vector and said each centroid;

adding the similarity score to a set of similarity scores;

identifying a strict subset of the set of similarity scores;

for each similarity score in the strict subset:

identifying a partition, in the centroids partition table, that corresponds to the centroid of said each similarity score;

wherein identifying the set of candidate vectors comprises identifying candidate vectors in the partition;

wherein identifying the value in the vector index comprises identifying the value associated with the partition.

13. The one or more non-transitory storage media of claim 12, wherein the value is stored in the partition, wherein the value is stored in association with a candidate vector in the partition.

14. The one or more non-transitory storage media of claim 12, wherein the instructions, when executed by the one or more computing devices, further cause:

storing, for each partition in the centroid partitions table, a non-vector index on the non-vector column;

wherein identifying the value in the vector index comprises traversing the non-vector index based on a predicate value in the predicate;

wherein identifying the candidate vectors in the partition is performed after traversing the non-vector index.

15. The one or more non-transitory storage media of claim 12, wherein identifying the partition comprises identifying a particular partition in the centroid partitions table, wherein the instructions, when executed by the one or more computing devices, further cause:

performing a single instruction, multiple data (SIMD) instruction on a set of multiple vectors in the particular partition, resulting in a plurality of vector distances, one for each vector in the set of multiple vectors;

after generating the plurality of vector distances, determining whether values, in the non-vector column, that correspond to the plurality of vector distances satisfy the predicate.

16. The one or more non-transitory storage media of claim 11, wherein:

the vector index is an Hierarchical Navigable Small Worlds Index (HNSW) index that comprises a vector table and a neighbor graph that comprises a plurality of levels that comprises a particular level comprising a graph of nodes representing neighbor relationships among vectors in the plurality of vectors;

traversing the vector index comprises, while traversing the graph of nodes:

maintaining a candidates heap and a results heap;

for each node of multiple nodes in the graph of nodes:

adding, to the candidates heap, a node identifier of said each node;

wherein identifying the value in the vector index comprises identifying the value in an entry, of the HNSW index, that is associated with the vector that corresponds to the node identifier;

determining whether to add the node identifier to the results heap only after determining that the value satisfies the predicate.

17. The one or more non-transitory storage media of claim 11, wherein the vector query is a top-K vector query that specifies a number of items to return, wherein the number of candidate vectors in the strict subset is equal to the number of items to return.

18. The one or more non-transitory storage media of claim 11, wherein the instructions, when executed by the one or more computing devices, further cause:

processing a transaction, wherein processing the transaction causes one or more changes to be made to the base table;

prior to committing the transaction, causing the one or more changes to be reflected persistently in storage.

19. The one or more non-transitory storage media of claim 18, wherein causing the one or more changes to be reflected persistently in storage comprises:

modifying the vector index to reflect the one or more changes; or storing the one or more changes in a shared change log that is persistently stored.

20. A system comprising:

one or more computing devices;

one or more non-transitory storage media storing instructions which, when executed by the one or more computing devices, cause:

receiving a vector query that includes a query vector and a predicate on a non-vector column of a base table that stores a plurality of vectors;

in response to receiving the vector query and while traversing a vector index, that is based on the plurality of vectors:

based on the query vector, identifying a set of candidate vectors;

for each candidate vector in the set of candidate vectors:

identifying, in the vector index, a value, associated with said each candidate vector, for the non-vector column, and determining whether the value satisfies the predicate; and selecting a strict subset, of the set of candidate vectors, whose values for the non-vector column satisfy the predicate;

for each candidate vector in the strict subset, computing a vector distance between the query vector and said each candidate vector;

determining a result of the vector query based on vector distances computed for the candidate vectors in the strict subset.

* * * * *